United States Patent [19]

Jamar

[11] 4,275,866
[45] Jun. 30, 1981

[54] OPERATOR FOR A GATE VALVE

[75] Inventor: Dwight W. Jamar, Hibbing, Minn.

[73] Assignee: Newcon Company, Tempe, Ariz.

[21] Appl. No.: 134,509

[22] Filed: Mar. 27, 1980

[51] Int. Cl.³ ............................................. F16K 31/54
[52] U.S. Cl. ....................................... 251/250; 74/30; 251/329
[58] Field of Search ............... 251/250, 291, 326, 327, 251/328, 329; 74/25, 89.12, 424.8 VA, 29, 30

[56] References Cited

U.S. PATENT DOCUMENTS

| | | | |
|---|---|---|---|
| 542,238 | 7/1895 | Brown | 251/250 |
| 886,208 | 4/1908 | Hadley | 251/250 |
| 1,028,497 | 6/1912 | Schmid et al. | 251/250 |
| 1,497,946 | 6/1924 | Schmidt | 251/250 |
| 1,654,093 | 12/1927 | Reid | 74/29 |
| 1,801,237 | 4/1931 | Hanson | 251/250 |
| 2,055,347 | 9/1936 | Hackman | 251/89 |
| 2,150,813 | 3/1939 | Ball | 251/249.5 |
| 2,223,702 | 12/1940 | Penick et al. | 251/250 |
| 2,297,597 | 9/1942 | White | 251/291 |
| 2,730,130 | 1/1956 | Guidry | 251/250 |
| 2,753,889 | 7/1956 | Carr et al. | 251/250 |
| 3,034,371 | 5/1962 | Cantalupo et al. | 251/248 |
| 3,230,781 | 1/1966 | Dubilier | 74/30 |
| 3,473,397 | 10/1969 | Fry | 251/250 |
| 4,231,389 | 11/1980 | Still et al. | 251/250 |

FOREIGN PATENT DOCUMENTS

| | | | |
|---|---|---|---|
| 129955 | 7/1919 | United Kingdom | 251/250 |
| 250118 | 4/1926 | United Kingdom | 251/250 |

Primary Examiner—Martin P. Schwadron
Assistant Examiner—G. L. Walton
Attorney, Agent, or Firm—Cahill, Sutton & Thomas

[57] ABSTRACT

A dual legged pedestal extending upwardly from the chest of a gate valve rotatably supports a pinion gear. The pinion gear, including a shaft having one end extending penetrably lateral to a leg of the pedestal, is in mesh with a rack affixed to the top of the rectilinearly translatable gate. A detachable tool is engageable with the extending end of the shaft for imparting rotary motion thereto resulting in translation of the rack. A combined spacer and thrust member adds rigidity to the legs of the pedestal and maintains the rack in mesh with the pinion gear.

4 Claims, 4 Drawing Figures

OPERATOR FOR A GATE VALVE

The present invention relates to gate valves and, more particularly, to operators for the gate of a gate valve.

Gate valves are generally employed to terminate or initiate flow through connected pipes; they are usually not used as a mechanism for regulating the flow rate. Accordingly, the gate of a gate valve is normally either in a fully extended or a fully retracted position.

At most installations, gate valves are employed to provide a capability for altering the flow through connected pipes on an essentially intermittent basis. For this reason, the gate valves are often unattended and sometimes located at remote locations.

To satisfy these parameters, means must be provided for relatively easily raising or lowering the gate, yet certain precautions must be taken to discourage unauthorized repositioning of the gate. U.S. Pat. No. 1,801,237 illustrates a conventional gate valve having a permanently attached frame extending upwardly from the chest of the gate valve. This frame supports a hand wheel operated pinion gear engaging a rack extending from the gate. On rotation of the non-detachable hand wheel, the gate may be raised or lowered. The gate is maintained in the raised or lowered state by means of a friction device employable to prevent rotation of the hand wheel but no means are disclosed for discouraging unauthorized operation of the gate valve. U.S. Pat. No. 2,730,130 is directed to a mechanism for simultaneously operating each gate of a plurality of gate valves.

U.S. Pat. Nos. 2,297,597 and 3,034,371 illustrates removable actuators for various types of valves. U.S. Pat. Nos. 1,028,497 and 2,055,347 and 1,497,946 illustrate various rack and pinion mechanisms for actuating different types of valves. U.S. Pat. Nos. 2,150,813 and 2,223,702 are of general interest with respect to actuating means for valves.

Because the actuating mechanism for a gate valve is generally used only intermittently, substantial commercial incentive exists to minimize the number of components and costs of the operator of the gate valve. However, the integrity and quality of the actuating mechanisms may not be compromised, particularly where the gate valve may need to be deployed in an emergency situation.

It is therefore a primary object of the present invention to provide a high quality low cost operator for gate valves.

Another object of the present invention is to provide a tamper resistant operator for gate valves.

Still another object of the present invention is to provide an operator for gate valves which is readily manufacturable from commercially available existing or readily modifiable components.

A yet further object of the present invention is to provide an operator for gate valves adaptable to any type of gate valve.

A further object of the present invention is to provide a robust operator for gate valves which will withstand normally expected abuses.

A still further object of the present invention is to provide an easily fabricatable operator for gate valves.

A yet further object of the present invention is to provide an operator for gate valves which is actuatable upon engagement by a conventional tool.

These and other objects of the present invention will become apparent to those skilled in the art as the description thereof proceeds.

The present invention may be described with greater specificity and clarity with reference to the following drawings, in which.

Figure 1:
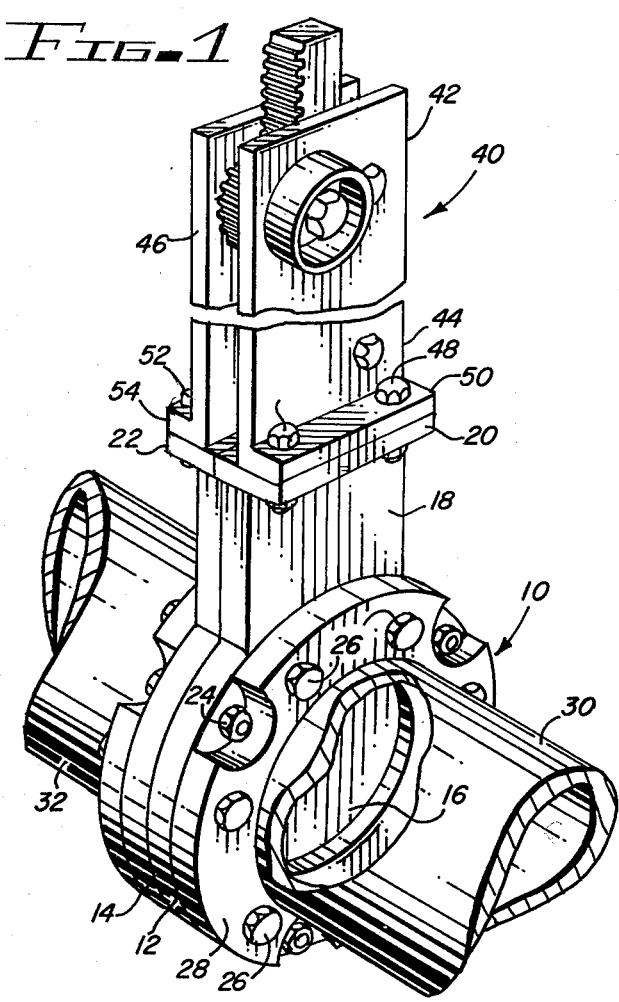
FIG. 1 is a perspective view of the operator mounted upon a gate valve.
Figure 2:
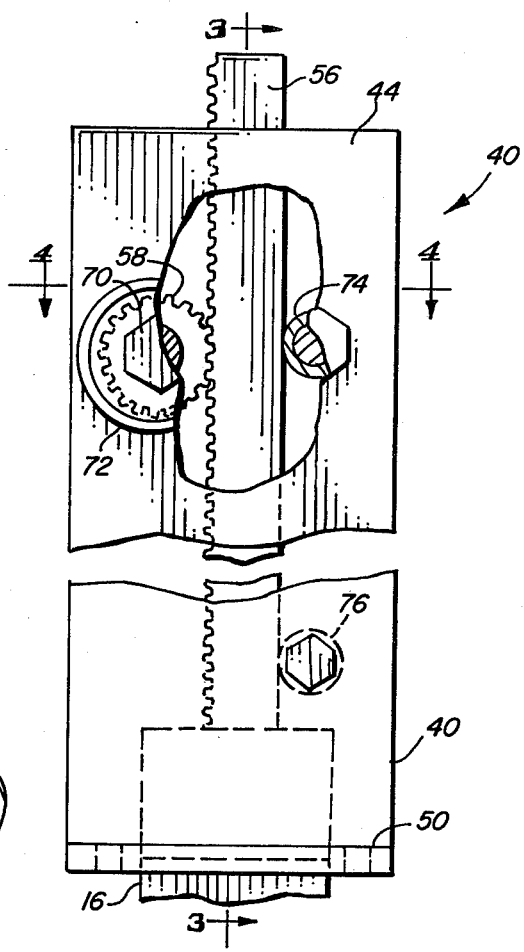
FIG. 2 is a front view of the operator.
Figure 3:
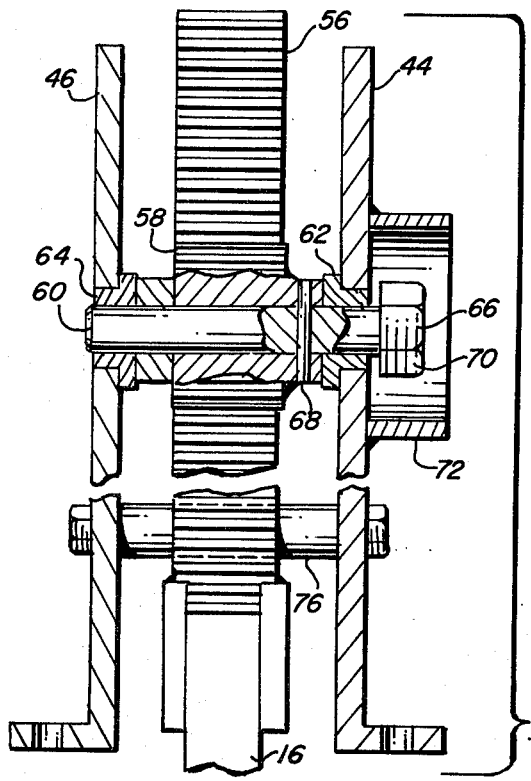
FIG. 3 is a side view of the operator.
Figure 4:
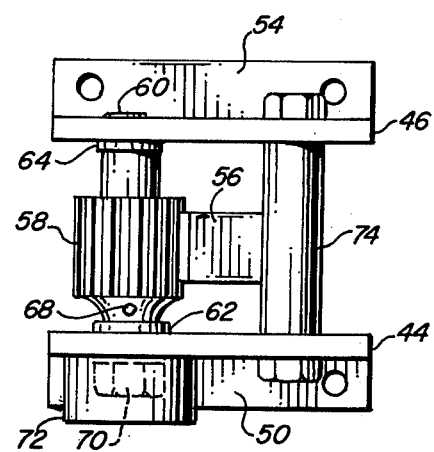
FIG. 4 is a cross-sectional view taken along lines 4—4, as shown in FIG. 2.

A conventional gate valve, such as gate valve 10 illustrated in FIG. 1, includes a pair of casings 12 and 14 slidably enclosing a gate 16. A chest 18 is formed as part of casings 12 and 14 for slidably supporting gate 16 within the gate valve. The gate extends upwardly through a stuffing box located at the upper end of the chest to effect a seal therebetween; other seals are also disposed between the casings and the gate to prevent unwanted flow and leakage. A pair of flanges 20 and 22 extend lateral to chest 18 at the top thereof to support an operator for the gate valve.

A plurality of bolts 24 secure casings 12 and 14 to one another. Further bolts 26 secure a flange 28 of pipe 30 to casing 12. Similar bolts secure the flange of pipe 32 to casing 14. As is readily receivable, the gate valve controls the flow between pipes 30 and 32.

Operator 40 will be described with joint reference to FIGS. 1, 2, 3 and 4. The operator includes a pedestal 42 formed by legs 44 and 46 in parallel spaced apart relationship to one another. Leg 44 is secured to flange 20 by means such as nut and bolt means 48 extending through base 50 of the leg and the flange. Similarly, leg 46 is secured to flange 22 by nut and bolt means 52 extending through base 54 of the leg and flange 22.

Pedestal 42 straddles gate 16 extending upwardly from the stuffing box (not shown) disposed at the top of chest 18. A toothed rack 56 is welded or otherwise secured to the gate, which rack extends upwardly intermediate legs 44 and 46. A pinion gear 58 is mounted upon shaft 60 and in mesh with rack 56. Journals 62 and 64 are disposed within legs 44 and 46 to rotatably retain shaft 60. Means are provided in at least journal 62 to permit end 66 of shaft 60 to extend laterally beyond leg 44. A pin 68 lockingly engages pinion gear 58 with shaft 60 to prevent independent rotation therebetween. Sliding contact intermediate the pinion gear and the bracketing journals maintains the pinion gear in fixed relationship intermediate legs 44 and 46.

To rotate pinion gear 58 and obtain commensurate translation of rack 56, a nut 70 or other tool engaging means is secured to end 66. To prevent unauthorized actuation of operator 40, a shroud 72 encircles nut 70. Thereby, only a conventional socket wrench or the like is engageable with the nut and unauthorized actuation of the gate valve is discouraged.

To maintain rack 56 in mesh with pinion gear 58, a cylindrical bearing member is secured intermediate legs 46 and 48 to prevent displacement of the rack from the pinion gear along a radial thereof. Member 74, interconnecting the legs of the pedestal, adds substantial rigidity to the pedestal.

Optionally, a second bearing member 76 may be employed intermediate the legs somewhat closer to the gate valve. Such a second bearing member will provide additional guidance to the rack by preventing bowing hereof. Moreover, further resistance to bending or deformation of the pedestals will result.

As may be deduced by one skilled in the art, all of the components of operator 40 are readily commercially available and useable as is or with only slight modifications. Such availability of components renders the cost of the operator very reasonable.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. An unenclosed operator for a gate translatable within the chest of a gate valve to open and close the gate valve by imparting translatory motion to the gate, said operator comprising in combination:
   (a) a non-enclosed pedestal mounted upon and extending from the chest of the gate valve and in general alignment with the rectilinear translatory motion of the gate, said pedestal comprising a pair of spaced apart legs located to straddle the gate;
   (b) translatable rack means for imparting rectilinear motion to the gate in either of two opposed directions;
   (c) rotatable means rotatably supported by said pedestal for engaging and translating said rack means, said rotatable means comprising a pinion gear, a shaft supporting said pinion gear and journals disposed in said pair of legs for journaling said shaft;
   (d) bearing means disposed intermediate said pair of legs for maintaining said rack means in engagement with said pinion gear and for maintaining said pair of legs positionally spaced with respect to one another;
   (e) said shaft including an end extending lateral to one leg of said pair of legs;
   (f) means for disengageably engaging said shaft end with a special tool to impart rotary motion to said shaft; and
   (g) shroud means for limiting access of other than the special tool to said shaft end.

2. The operator as set forth in claim 1 wherein said end of said shaft includes a hexagonal nut welded thereto for engaging the tool.

3. The operator as set forth in claim 2 wherein said shroud means comprises a section of a cylinder encircling said nut.

4. The operator as set forth in claim 1 including a further bearing means for stabilizing said pair of legs and preventing bowing and bending of said pedestal while providing rolling support for said rack means.

* * * * *